United States Patent
Quillen et al.

(10) Patent No.: US 7,266,776 B2
(45) Date of Patent: Sep. 4, 2007

(54) FACILITATING COMMUNICATIONS BETWEEN COMPUTER USERS ACROSS A NETWORK

(75) Inventors: Scott A. Quillen, Middleburg, VA (US); Ira Rosenblatt, Great Falls, VA (US)

(73) Assignee: AOL LLC, Dulles, VA (US)

( * ) Notice: Subject to any disclaimer, the term of this patent is extended or adjusted under 35 U.S.C. 154(b) by 825 days.

(21) Appl. No.: 10/330,670

(22) Filed: Dec. 30, 2002

(65) Prior Publication Data

US 2004/0103156 A1 May 27, 2004

Related U.S. Application Data

(60) Provisional application No. 60/428,726, filed on Nov. 25, 2002.

(51) Int. Cl.
*G06F 15/16* (2006.01)
*G06F 3/00* (2006.01)

(52) U.S. Cl. ...................... 715/758; 715/847

(58) Field of Classification Search ........ 715/748–749, 715/802, 804, 805, 811, 769, 846, 835–839, 715/736–739, 847, 742, 752, 758; 700/56; 379/265.09; 370/352, 395.54; 709/206, 709/224; 455/90.2; 713/150, 155, 168
See application file for complete search history.

(56) References Cited

U.S. PATENT DOCUMENTS

| | | | |
|---|---|---|---|
| 5,801,700 A | | 9/1998 | Ferguson |
| 6,191,807 B1 | | 2/2001 | Hamada et al. |
| 6,496,201 B1 | * | 12/2002 | Baldwin et al. ............ 715/753 |
| 6,763,226 B1 | * | 7/2004 | McZeal, Jr. ................ 455/90.2 |
| 6,865,268 B1 | * | 3/2005 | Matthews et al. ...... 379/265.09 |
| 6,883,094 B2 | * | 4/2005 | Kitamura ................... 713/150 |
| 2002/0062361 A1 | * | 5/2002 | Kivipuro et al. ............ 709/219 |
| 2002/0181472 A1 | * | 12/2002 | Horikawa ............... 370/395.54 |
| 2003/0013483 A1 | * | 1/2003 | Ausems et al. ............. 455/556 |
| 2003/0079024 A1 | * | 4/2003 | Hough et al. ................ 709/227 |
| 2003/0125062 A1 | * | 7/2003 | Bethards et al. ............ 455/517 |
| 2003/0140103 A1 | * | 7/2003 | Szeto et al. ................. 709/206 |
| 2003/0208543 A1 | * | 11/2003 | Enete et al. ................. 709/206 |
| 2003/0210265 A1 | * | 11/2003 | Haimberg ................... 345/758 |
| 2003/0219104 A1 | * | 11/2003 | Malik ...................... 379/88.11 |
| 2003/0221167 A1 | * | 11/2003 | Goldstein et al. ........... 715/513 |

(Continued)

OTHER PUBLICATIONS www.cs.hmc.edu/~ben/gnome/summit/, Links From the 2002 Boston Gnome Summit, Oct. 28, 2002, 1 page.

(Continued)

*Primary Examiner*—Steven Sax
(74) *Attorney, Agent, or Firm*—Fish & Richardson P.C.

(57) ABSTRACT

An icon or file is provided to facilitate communications across a network. The icon or file represents a contact or set of contacts and is separate from the communications program's user interface. At least one action is executed in response to an operation performed on the icon or a command issued to the file. The actions may generally include, for example, retrieving profile information about the contact, setting an alert to indicate that the contact's network/login status has changed (e.g., login, logout, or idle), or performing communications with the contact. The action may be the same action that would be executed in response to an operation performed on a representation of the contact or set of contacts in a user interface of a communications program.

90 Claims, 18 Drawing Sheets

U.S. PATENT DOCUMENTS

| | | | |
|---|---|---|---|
| 2004/0054428 A1* | 3/2004 | Sheha et al. | 700/56 |
| 2004/0056893 A1* | 3/2004 | Canfield et al. | 345/753 |
| 2004/0056901 A1* | 3/2004 | March et al. | 345/811 |
| 2004/0103156 A1 | 5/2004 | Quillen et al. | |
| 2004/0192397 A1* | 9/2004 | Walston et al. | 455/566 |
| 2004/0201624 A1* | 10/2004 | Crawford | 345/751 |
| 2005/0030937 A1* | 2/2005 | Wick et al. | 370/352 |
| 2006/0106734 A1* | 5/2006 | Hoffman et al. | 705/64 |
| 2007/0006094 A1* | 1/2007 | Canfield et al. | 715/781 |

OTHER PUBLICATIONS www.cs.hmc.edu/~ben/gnome/summit/gaim-talk.html, Notes on Gaim: Instant Messaging for the Desktop User, Oct. 28, 2002, 2 pages.

www.slaughterhouse.com/pick_071497.html, Pick of the Day—Jul. 14, 1997, Oct. 28, 2002, 2 pages.

* cited by examiner

320

```
┌─────────────────────────────────┐
│ Provide file that is associated │
│      with a contact or set      │
│          of contacts            │
│             325                 │
└─────────────────────────────────┘
                │
                ▼
┌─────────────────────────────────┐
│   Recognize an issued command   │
│             330                 │
└─────────────────────────────────┘
                │
                ▼
┌─────────────────────────────────┐
│  Execute at least one action in │
│  response to the issued command │
│             335                 │
└─────────────────────────────────┘
```

```
Provide icon that represents a contact or set of
contacts and is separate from an application
user interface
405
```

```
Recognize that a second icon has been dropped
onto the first icon
410
```

```
Automatically transmit the information
represented by the second icon to the contact or
set of contacts represented by the first icon
415
```

FACILITATING COMMUNICATIONS BETWEEN COMPUTER USERS ACROSS A NETWORK

CROSS-REFERENCE TO RELATED APPLICATIONS

This application claims priority to U.S. Provisional Application Ser. No. 60/428,726, filed on Nov. 25, 2002, which is hereby incorporated by reference.

TECHNICAL FIELD

This description relates to electronic communications.

BACKGROUND

With the advent of the Internet and a decline in computer prices, many people are communicating with one another through computers interconnected by networks. A number of different communications programs have been developed to facilitate such communications between computer users. These programs typically have a user interface that contains representations of a user's contacts (i.e., other users who are connected to the network with whom the user of the program can communicate). A user may invoke communications with a particular contact by selecting a representation of that contact that is maintained in the communications program's user interface. Similarly, the user may select a contact's representation to cause other actions to be executed with respect to the contact (e.g., set an alert to let the user know when the contact is online).

SUMMARY

In one general aspect, an icon is provided to facilitate network communications between users of at least one communications program. The icon represents a contact or set of contacts and is independent of the user interface of the communications program. At least one action is executed in response to an operation performed on the icon, which action is the same as an action that would be executed in response to an operation performed on a representation of the contact or set of contacts in a user interface of the communications program.

In another aspect, a file is provided to facilitate communications across a network between users of at least one communications program. The file is associated with a contact or set of contacts. When a command is issued to the file, at least one action is executed in response to the command. The action is the same as an action that would be executed in response to an operation performed on a representation of the contact or set of contacts in a user interface of the communications program.

In another general aspect, a first icon is provided to facilitate the transfer of information between computer users on a network. The first icon represents a contact or set of contacts and is separate from an application user interface. When a second icon is dropped onto the first icon, the information represented by the second icon is automatically transmitted to the contact or set of contacts represented by the first icon.

Implementations of the various aspects may include one or more of the following features. For example, the icon that represents the contact or set of contacts may be independent of any application user interface. The file associated with a contact or set of contacts may be represented by an icon and the issued commands may be graphical operations performed on the icon representing the file.

The operations may comprise associating information to be transmitted to the contact or set of contacts with the icon representing the contact(s) or the icon representing the file. The information may be associated by dropping an icon representing the information to be transmitted to the contact or set of contacts on the icon. Whether in text or file form, the information may be transmitted by a communication session directly established between the users, or it may be transmitted via a host server.

The icon that represents a contact or set of contacts or the icon that represents the file may be available when the communications program is not executing. The communications program may be initiated in response to performance of an operation on the icon that represents a contact or set of contacts.

The communications program may be an electronic mail (e-mail) program, instant messaging (IM) program, file transfer protocol (FTP) program, voice-over-IP (VoIP) program, etc.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 3B is a flow chart illustrating another process used to facilitate communications between users across a network.

Like reference symbols in the various drawings indicate like elements.

DETAILED DESCRIPTION

Generally, an icon that is independent of a communication program's user interface is provided on a client system to facilitate a client system user in communicating with other network users. The icon represents an identity or set of identities with whom the person desires to communicate (i.e., contacts or buddies). The icon provides an interface for initiating actions related to the identity or set of identities from outside of a communication application user interface. The actions are initiated by performing operations on the icon. Such operations may generally include, for example, "double-clicking" on the icon, "right-clicking" on the icon, or dragging and dropping files onto the icon. The resulting actions may generally include, for example, retrieving profile information about the contact, setting an alert to indicate that the contact's network/login status has changed (e.g., login, logout, or idle), or performing communications with the contact, such as sending an instant message, sending a file, establishing a VoIP communication session, or sending an e-mail. Thus, the icon may allow a user to initiate and perform actions relating to a contact without using a communication program's user interface and whether or not the communication program is running when the operations are performed on the icon.

In another implementation, a file is provided that is associated with a contact or set of contacts. Commands can be issued to the file. In response to the commands, an action relating to communications with the contacts or set of contacts is initiated. The resulting actions may generally include, for example, retrieving profile information about the contact, setting an alert to indicate that the contact's network/login status has changed (e.g., login, logout, or idle), or performing communications with the contact, such as sending an instant message, sending a file, establishing a VoIP communication session, or sending an e-mail.

The file may be implemented in either a graphical or non-graphical operating system environment. When the file is implemented in a graphical environment, an icon may be used to represent the file. In this case, the commands may generally include, for example, "double-clicking" on the icon, "right-clicking" on the icon, dragging and dropping files onto the icon, or dragging and dropping the icon onto another icon or onto the user interface of an application. When the file is implemented in a non-graphical environment, commands may be issued to the file from a command line. The commands may take the form of parameters passed to the file from the command line.

Figure 1:
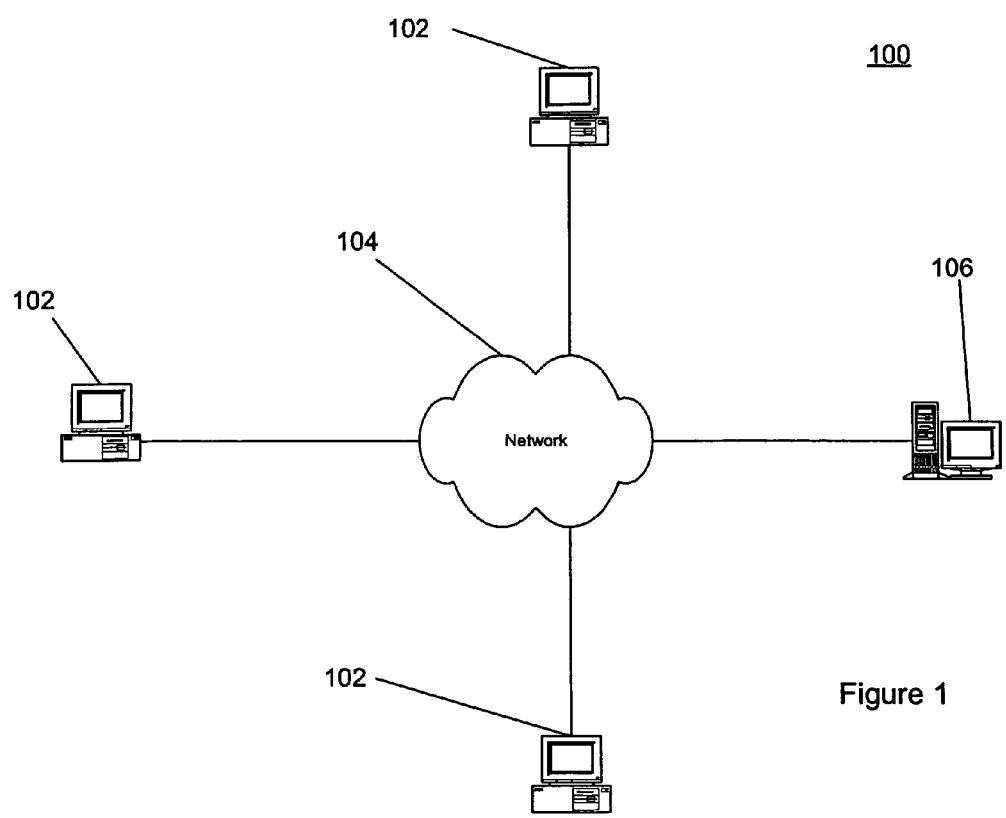
FIG. 1 is a block diagram illustrating an exemplary networked computing environment that supports communications between computer users.

FIG. 1 illustrates an exemplary networked computing environment 100 that supports communications between computer users. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the client systems 102 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 102. For instance, such communications programs may include e-mail programs, IM programs, FTP programs, VoIP programs, etc. The instructions may be embodied permanently or temporarily in any type of machine, component, equipment, storage medium, or propagated signal that is capable of being delivered to the client systems 102.

Clients systems 102 include a communications interface (not shown) used by the communications programs to send communications through network 104. The communications may include e-mail, audio data, video data, general binary data, or text data (e.g., encoded in American Standard Code for Information Interchange (ASCII) format).

The network 104 typically includes a series of portals interconnected through a coherent system. Examples of the network 104 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 104 may include multiple networks or subnetworks, each of which may include, for example, a wired or wireless data pathway.

A host server 106 also may be connected to network 104 and may be used to facilitate some direct or indirect communications between the client systems 102. As with the client systems 102, host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 106 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include e-mail programs, IM programs, FTP programs, VoIP programs, etc. The instructions may be embodied permanently or temporarily in any type of machine, component, equipment, storage medium, or propagated signal that is capable of being delivered to the host server 106.

Further, host server 106 includes a communications interface (not shown) used by the communications programs to send communications through network 104. The communications may include e-mail, audio data, video data, general binary data, or text data (e.g., encoded in American Standard Code for Information Interchange (ASCII) format).

Figure 2:
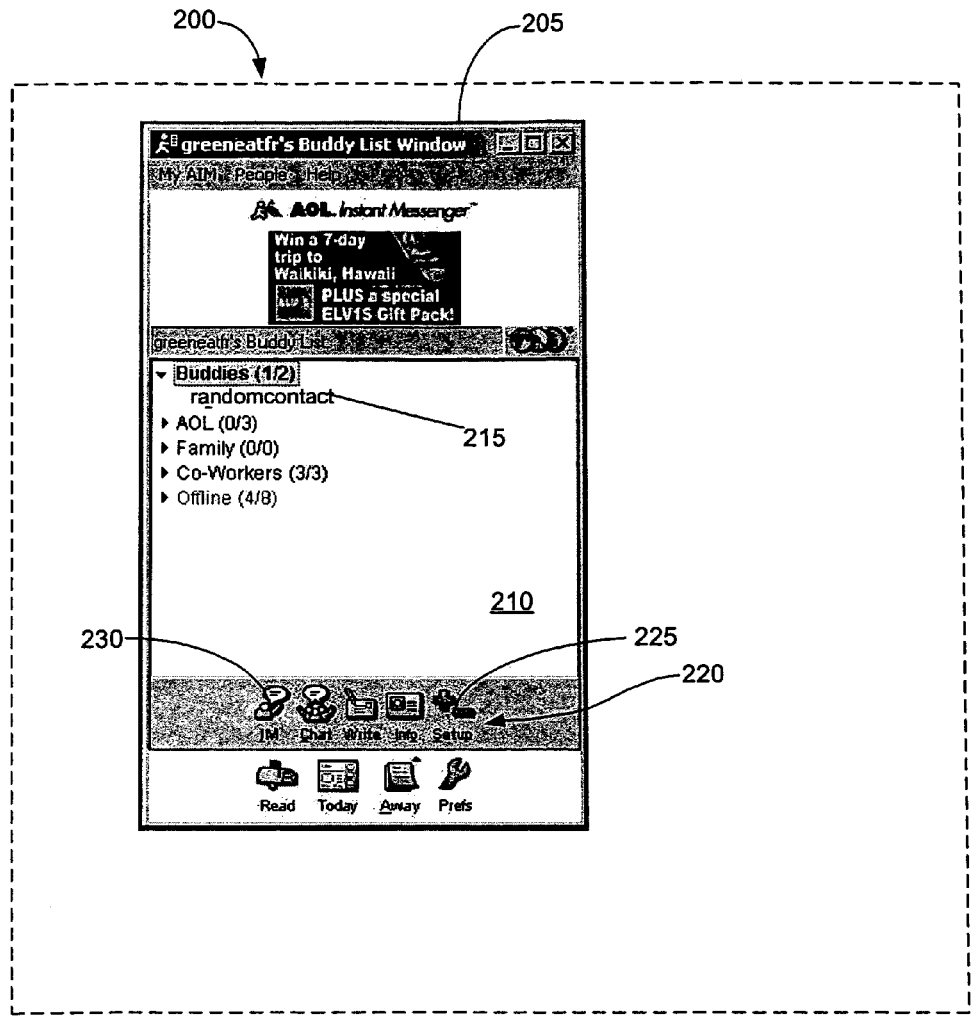
FIG. 2 is a computer desktop illustrating an example of a communications program interface presented to a user of the communications program.

FIG. 2 illustrates an example interface presented to a user of one of the client systems 102 when running an instant messaging client program. Instant messaging programs typically allow users to communicate in real-time with each other in a variety of ways. For example, many instant messaging programs allow users to send text as an instant message, to transfer files, and to communicate by voice. Examples of IM communications include those provided by AIM (America Online Instant Messenger), AOL (America Online) Instant Messaging, Yahoo Messenger, MSN Messenger, and ICQ, among others.

Shown is a desktop 200 with a user interface 205 of the instant messaging client program. User interface 205 has a text box 210 that displays representations 215 of the program user's contacts or buddies (both terms are used interchangeably herein), which are other users of an instant messaging program with whom the program user desires to communicate and interact. The representations 215 may provide contextual information to the program user about the buddy, such as whether the contact is online, how long the contact has been online, whether the contact is away, or whether the contact is using a mobile device.

The list of contacts displayed in text box 210 of user interface 205 typically is referred to as the contact list or buddy list. The program user can typically add or remove contacts from the contact list. In the example shown, the representations 215 are text icons showing the screen names of the contacts.

Instant messaging programs may use an instant messaging server to assist in communications between users of the instant messaging program. The instant messaging server may be implemented, for example, using host server 106. When a user is connected to the network and executes the instant messaging program, the instant messaging program contacts the host server 106 and logs the user onto the host server 106. The host server 106 informs the instant messaging program when the program user's contacts are online and facilitates communications between the program user and an online contact.

The host server 106 may support IM services irrespective of a program user's network or Internet access. Thus, host server 106 may allow users to send and receive IMs, regardless of whether they have access to any particular Internet service provider (ISP). The host server 106 also may support associated services, such as administrative matters, advertising, directory services, chat, and interest groups related to IM. To transfer data, the host server 106 employs one or more standard or exclusive IM protocols.

To begin an IM session, the IM client program running on a client system 102 establishes a connection with the host server 106 and logs onto the host server 106. Once a session is established, a user can use the IM client program to view whether particular buddies are online, exchange IMs with particular buddies, participate in group chat rooms, trade files such as pictures, invitations or documents. The program user also may be able to find other buddies with similar interests, get customized information such as news and stock quotes, and search the World Wide Web.

Host server 106 may assist IM communications between users of IM client programs by facilitating the establishment of a peer-to-peer communication session between the IM client programs. Or the host server 106 may assist IM communications by directly routing communications between the IM client programs.

When a contact is online, the program user can communicate or interact with the contact in a number of ways. For instance, the program user can send an instant message to the contact (typically in the form of text). Sending a message opens up a window in which messages can be typed back-and-forth between the program user and the contact. Similarly, the program user also can send a file or other content to the contact.

To initiate these actions for a contact, the program user performs operations on the representation of the contact displayed in user interface 205. The program then executes the corresponding action in response to the operation performed on the representation. For example, an instant message might be initiated by double-clicking on a contact's representation. Or, a file transfer might be initiated by the program user selecting the contact's representation to bring up a context menu and choosing "send a file" from the menu.

Other actions can be executed in response to operations performed on the representation of the contact displayed in interface 205. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 205 may have icons 220 to help a user set various options or perform operations in the instant messaging program. By selecting the "setup" icon 225, for example, the program user can invoke a window that allows for manual addition or removal of contacts from the buddy list. Some of the icons 220 also may assist in initiating communications or interactions. The "IM" icon 230, for instance, may be used as an alternative way to initiate instant messages. For instance, the program user can highlight the representation of a contact, and initiate an instant message with that contact by selecting the "IM" icon.

Figure 3A:
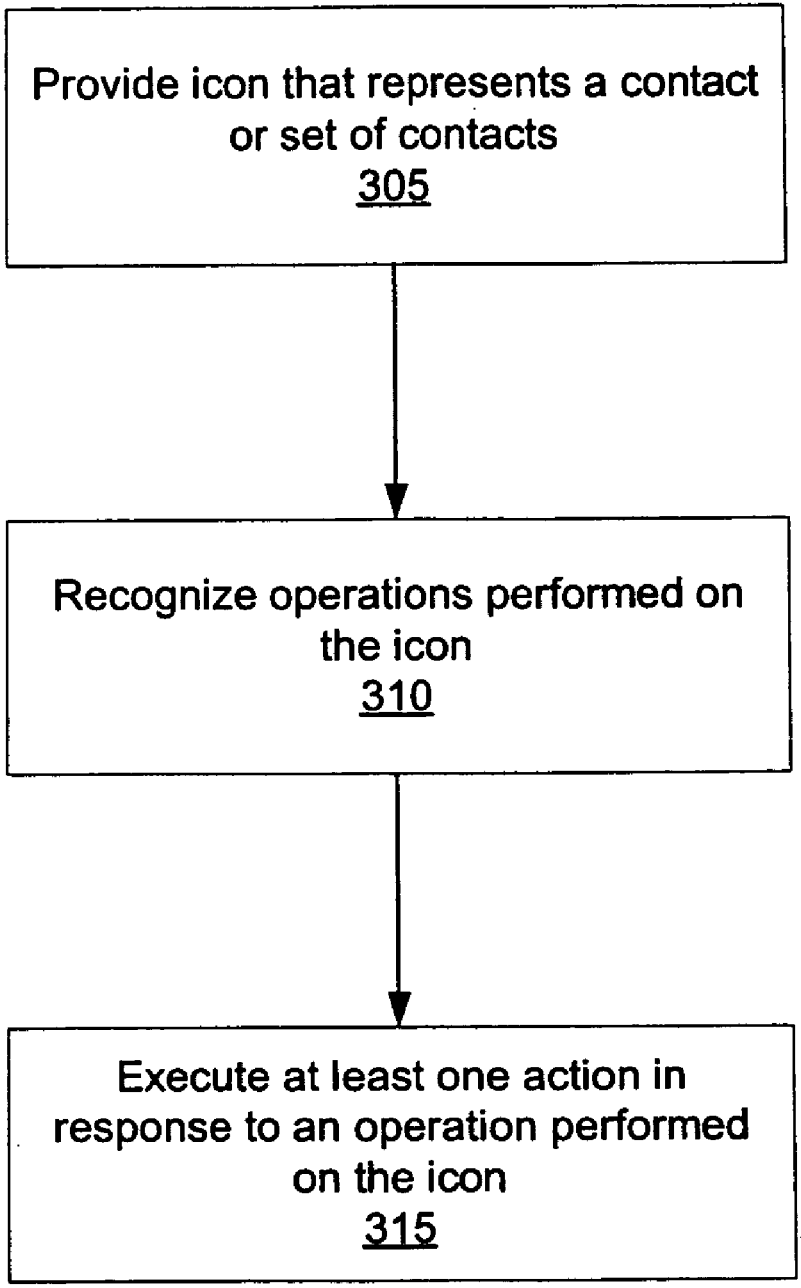
FIG. 3A is a flow chart illustrating a process used to facilitate communications between users across a network.

FIG. 3A illustrates a process 300 used to facilitate communications between users across a network. An icon that represents a contact or set of contacts is provided (step 305). The term "icon" is used generally herein to denote any graphical representation of an object. The icon is not part of an application user interface. That is, rather than being maintained in and as an integral part of an application user interface, the icon is independent of at least the communication program interface, and perhaps any application user interfaces.

When operations are performed on the icon, they are recognized (step 310). Various operations can be performed on the icon. For example, a user may "double-click" on the icon by using an input device like a mouse to point a cursor at the icon and pressing a button of the mouse twice. A user may "right-click" on the icon by using an input device like a mouse with a left and right button to point a cursor at the icon and pressing the right button of the mouse. A user may select the icon in such a way that brings up a context menu (e.g., by right-clicking on the icon) and select an option from the context menu. A user may drag-and-drop other icons onto the icon representing the contact or set of contacts (further described below). The icon representing the contact may itself be dragged and dropped onto another icon or onto the user interface of an application.

In response to operations performed on the icon, at least one action related to the contact or set of contacts represented by the icon is executed (step 315). For instance, the action can include sending an IM, sending a file, setting a buddy icon, retrieving profile information about the contact, setting an alert for when the contact comes online, establishing a VoIP communication session, or sending an e-mail. These actions may be the same actions that would be executed in response to an operation performed on a representation of the contact or set of contacts in a user interface of the communications program. Thus, the icon may provide an interface for initiating actions related to a contact from outside of a communication program's user interface.

FIG. 3B illustrates another process 320 used to facilitate communications between users across a network. In process 320, an executable file that is associated with a contact or set of contacts is provided (step 325). Various commands can be issued to the file. When a command is issued to the file, the issued command is recognized (step 330). In response to the issued command, the file causes a corresponding action to be executed (step 335). The action is related to communicating with the contact(s) associated with the file. The commands can be issued to the file while the file is already executing, as part of a command to execute the file, or as a combined command that executes the file and results in the action being executed (i.e., the same command may be used to execute the file and cause the action to be executed).

The file may be located in either graphical or non-graphical operating system environments. When the executable file is in a graphical environment, it may be represented by an icon. For example, in Microsoft Windows® and Macintosh OS X environments, most files are represented by icons. As a result, providing a file in such an environment typically results in an icon also being provided. The commands issued to execute the file may be graphical operations performed on the icon. For example, the commands may generally include "double-clicking" on the icon, "right-clicking" on the icon, dragging and dropping files onto the icon, or dragging and dropping the icon onto another icon or onto the user interface of an application. Such an implementation of process 320 is similar to the implementation described with respect to FIG. 3A.

When the executable file is in a non-graphical environment, the commands may be issued to the executable file using command lines. The commands may take the form of parameters passed to the executable program from the command line. The parameters may either be passed to the executable while it is already executing, or the parameters may be passed as part of a command that causes the executable file to execute.

The actions executed in response to an issued command may generally include, for example, sending an IM, sending a file, setting a buddy icon, retrieving profile information about the contact, setting an alert for when the contact comes online, establishing a VoIP communication session, or sending an e-mail. These actions may be the same actions that would be executed in response to an operation performed on a representation of the contact or set of contacts in a user interface of the communications program. Thus, the file acts as a proxy for initiating actions related to a contact from outside of a communication program's user interface.

Figure 4:
FIG. 4 is a flow chart illustrating a process for using drag-and-drop features with an icon representing a contact for actions such as transferring files or text to the contact.
Figure 4:

FIG. 4 illustrates a process 400 for using drag-and-drop features with an icon that represents a contact or set of contacts, providing an intuitive interface for actions such as transferring files or text. The icon that represents the contact or set of contacts is provided independent from an application user interface, as described above with respect to FIG. 3 (step 405). The icon provides an interface for initiating the transfer of information to the contact(s) it represents from outside of any application's user interface (e.g., on the desktop or in a file folder).

When a user wants to transfer information to the contact or set of contacts represented by this icon, the user drags and drops a second icon that represents the information onto the icon representing the contact or set of contacts. The information may be any type of data, including e-mail, audio data, video data, general binary data, or text data.

The drop is recognized (step 410) and results in the information represented by the second icon being automatically transferred to the contact or set of contacts (step 415). The information can be transmitted to the contact in any known manner. For instance, a peer-to-peer connection can be established and, if the information is in the form of a general binary file, it may be transmitted using a standard or proprietary file transfer protocol. Or, if the information is, for example, streaming audio or video, the information may be transmitted on the peer-to-peer connection using the real-time protocol (RTP) and real-time streaming protocol (RTSP). Similarly, if the information is a text file, the peer-to-peer connection may be used to transfer the text in the text file as an IM.

Alternatively, a host server may be used to assist in the transmission of the information. For instance, if the information is a text file, the host server may relay the text file to the contact as an IM. Or, if the information is in the form of a general binary file, it may be transmitted to the host server, which relays it to the contact using a standard or proprietary file transfer protocol. Likewise, streaming audio or video can be transmitted to the host server, which then relays it to the contact.

FIGS. 5A-5F illustrate one implementation of the above techniques for an instant messaging program. Shown is a desktop 500 with a user interface 205 of the instant messaging program. User interface 205 has a text box 210 that displays representations 215 of the program user's contacts. In the example illustrated, one contact, whose screen name is "randomcontact," is listed.

An icon 520 is located on desktop 500. Icon 520 represents the program user's contact "randomcontact." Icon 520 is not part of any application user interface. Rather, icon 520 is displayed independent of an application user interface. Icon 520 is associated with an executable program or script that is invoked for some operations performed on icon 500. The executable program communicates with the instant messaging program to accomplish the actions to be executed in response to the operations performed on icon 520. The executable program may communicate with the instant messaging program using any known inter-application communications protocol, such as, for example, Apple Events if implemented for a Macintosh OS X environment or dynamic data exchange (DDE) if implemented for a Microsoft Windows® environment. While shown on desktop 500, icon 520 can be moved like any other file and located in a file system folder, if desired.

Thus, a user can initiate actions related to the contact "randomcontact" by performing operations on icon 520. As described above, various types of operations can be performed on icon 520, such as "double-clicking" on icon 520, "right-clicking" on icon 520, dragging and dropping other icons onto icon 520, or dragging and dropping icon 520 onto another icon or onto the user interface of an application.

The executable program is invoked when operations are performed on icon 520 that correspond to actions related to the contact represented by icon 520. When invoked, the executable program in turn may invoke the instant messaging program if the instant messaging program is not already executing. The invocation of the instant messaging program may or may not be made known to the user. For example, invocation of the instant messaging program may be made known to the user by presenting the instant messaging program's interface to the user in the same manner as it would be presented if the user had directly invoked the program. Or, an icon can be displayed in the system tray (if, for example, the techniques are implemented for a Microsoft Windows® environment).

As an alternative to invoking the instant messaging program, the executable program may queue the actions until the instant messaging program is invoked by the user. In this case, when the instant messaging program is subsequently invoked the executable program will communicate with the instant messaging client program to accomplish the actions.

When the instant messaging program is running, the executable program passes the screen name of the contact that icon 520 represents (i.e., "randomcontact") to the instant messaging program, along with an indication of the action to be executed and any other necessary information needed to perform the action (e.g., filename). The instant messaging program accepts this information and executes the action corresponding to the operations performed on icon 520.

Figure 5A:
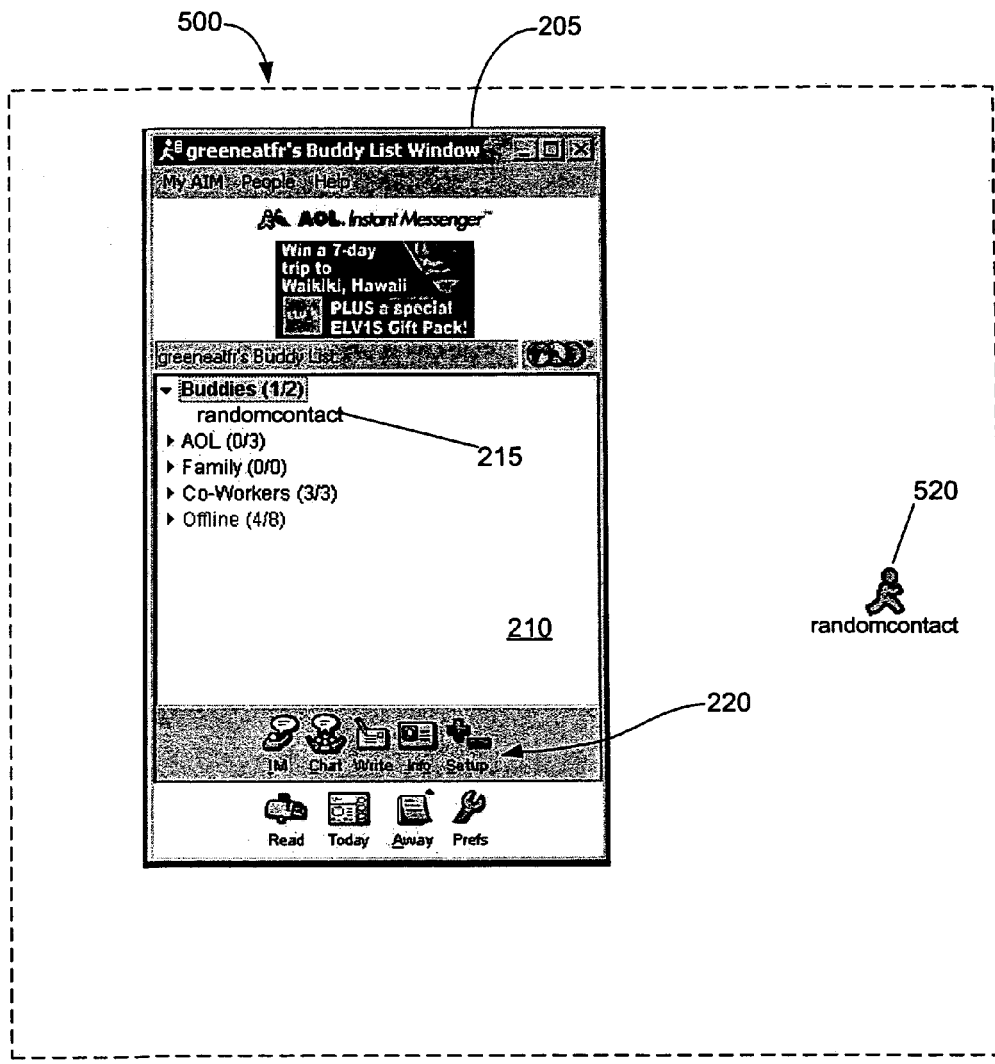
FIGS. 5A–5F are computer desktops illustrating implementations of the described techniques for an instant messaging program.
Figure 5B:
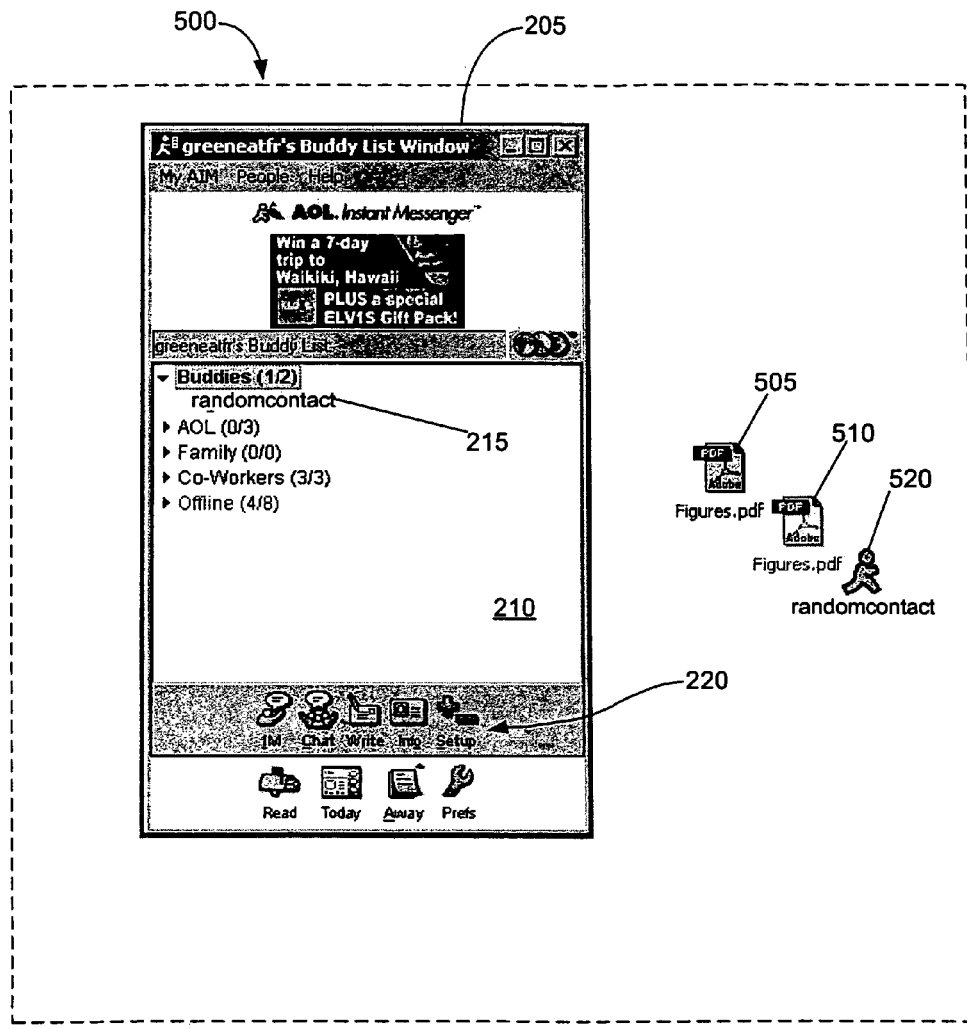
Figure 5C:
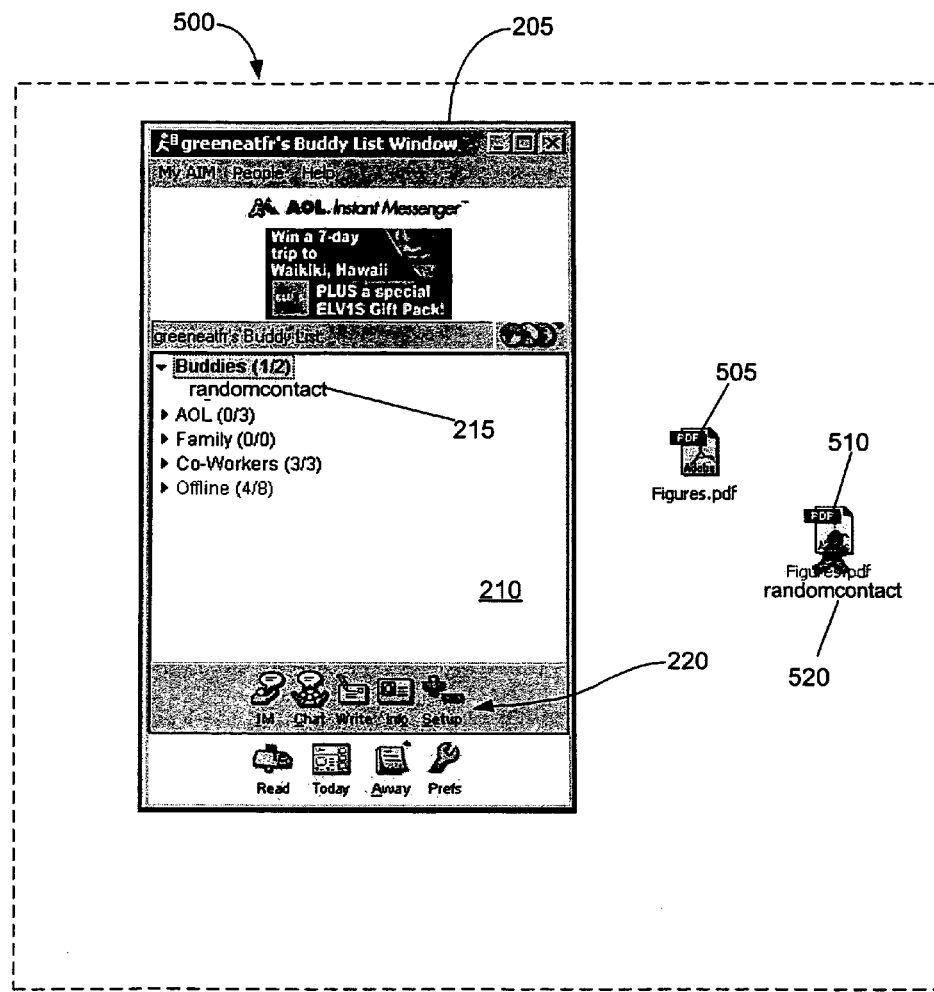
Figure 5D:
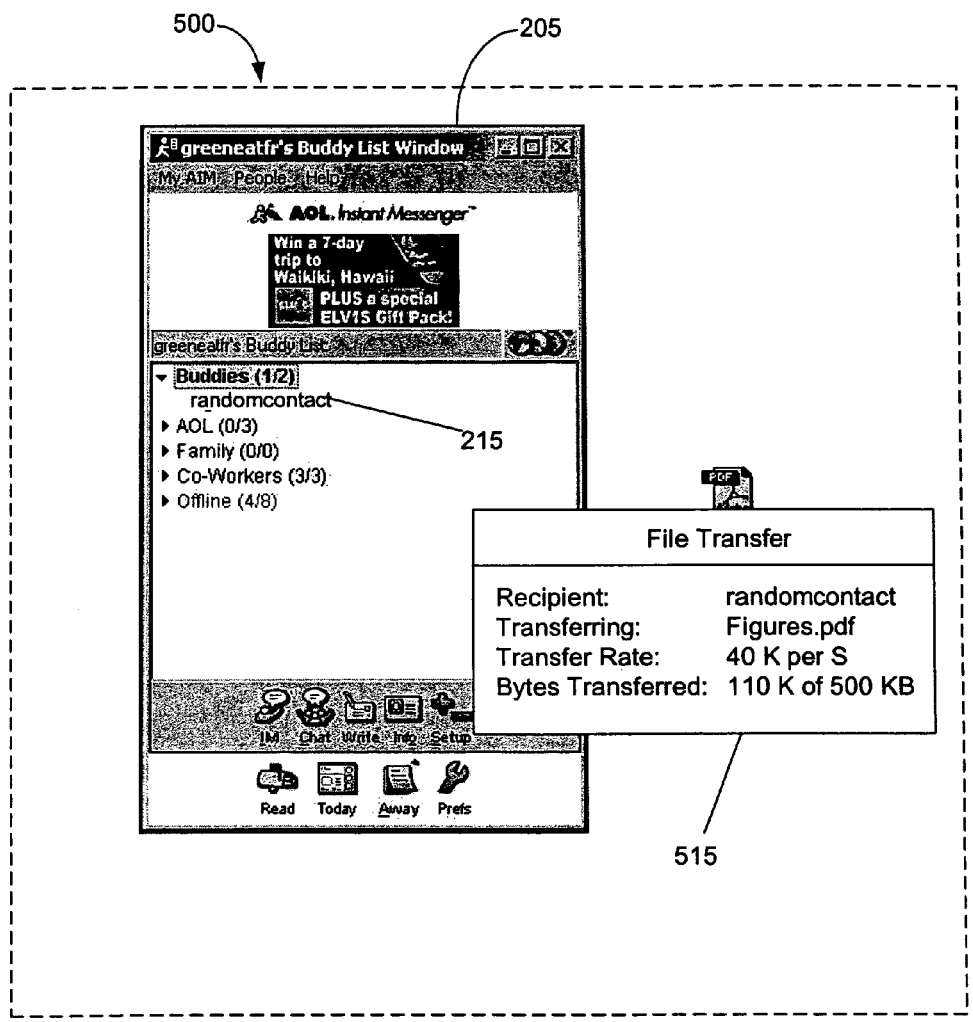

As an example of operations that can be performed, a drag-and-drop file transfer is described with respect to FIGS. 5B–5D. An icon 505 on desktop 500 represents a general binary file. To transfer the file to the contact "randomcontact," the user drags and drops icon 505 onto icon 520. To drag icon 505 onto icon 520, the user first selects icon 505, for example, by pointing at it and pressing a mouse button. The user then drags the icon 505 towards icon 520. As the user drags the icon across desktop 500, a second transparent image 510 of icon 520 shows the user where icon 505 is being dragged. Once icon 505 is on top of icon 520 (as shown in FIG. 5C), the user drops icon 505, for example, by releasing the mouse button.

When the user drops icon 505 onto icon 520, the executable program associated with icon 520 is invoked. The executable program determines whether the instant messaging program is executing and logged onto the host server. If the instant messaging program is not executing or is not logged on, the executable program invokes the instant messaging program and causes it to log onto the host server.

When the instant messaging program is executing and is logged on (whether it was originally or was invoked by the executable program), the executable program passes to the instant messaging program the screen name that icon 520 represents (in the case shown, "randomcontact"), the filename, and an indication that the file should be transferred.

The instant messaging program then initiates a file transfer to the contact. To do so, the instant messaging program contacts the host server and indicates that a file transfer to the contact is desired. The host server indicates to the contact that the program user wishes to transfer the file and seeks permission from the contact for the file to be transferred. As long as the contact grants permission for the file to be transferred, the host server returns the address of the contact to the instant messaging program, along with an indication that the transfer is allowed.

The instant messaging program then sets up a peer-to-peer connection with the contact's instant messaging program and transfers the file. As the file is being transferred, the instant messaging program may display a file transfer status dialog 515 (shown in FIG. 5D). File transfer status dialog 515 shows the current status of the file transfer. As shown, it displays the recipient, which in this case is "randomcontact." It also displays the filename of the file being transferred (Figures.pdf), the transfer rate (40K/s), and the number of bytes already transferred (110K). Once the transfer is completed, feedback (e.g., a sound) may be provided to the user to indicate the transfer is completed and file status dialog 515 is closed.

Similar to a file transfer, drag-and-drop instant message sessions can be supported when a user drops a text file onto icon 520. Thus, for example, if the file shown in FIG. 5B was named Figures.txt and contained ASCII text, then an instant message would be initiated when it is dropped on icon 520, rather than a file transfer. In this case, when the text file is dropped, the executable program retrieves the text from the file. The executable program then passes the screen name that icon 520 represents and the text to the instant messaging program, along with an indication that the text is to be sent as an instant message. The instant messaging program then contacts a host server and transmits the text and screen name to the host server. The host server then directly communicates the text to the contact as an instant message.

Figure 5E:
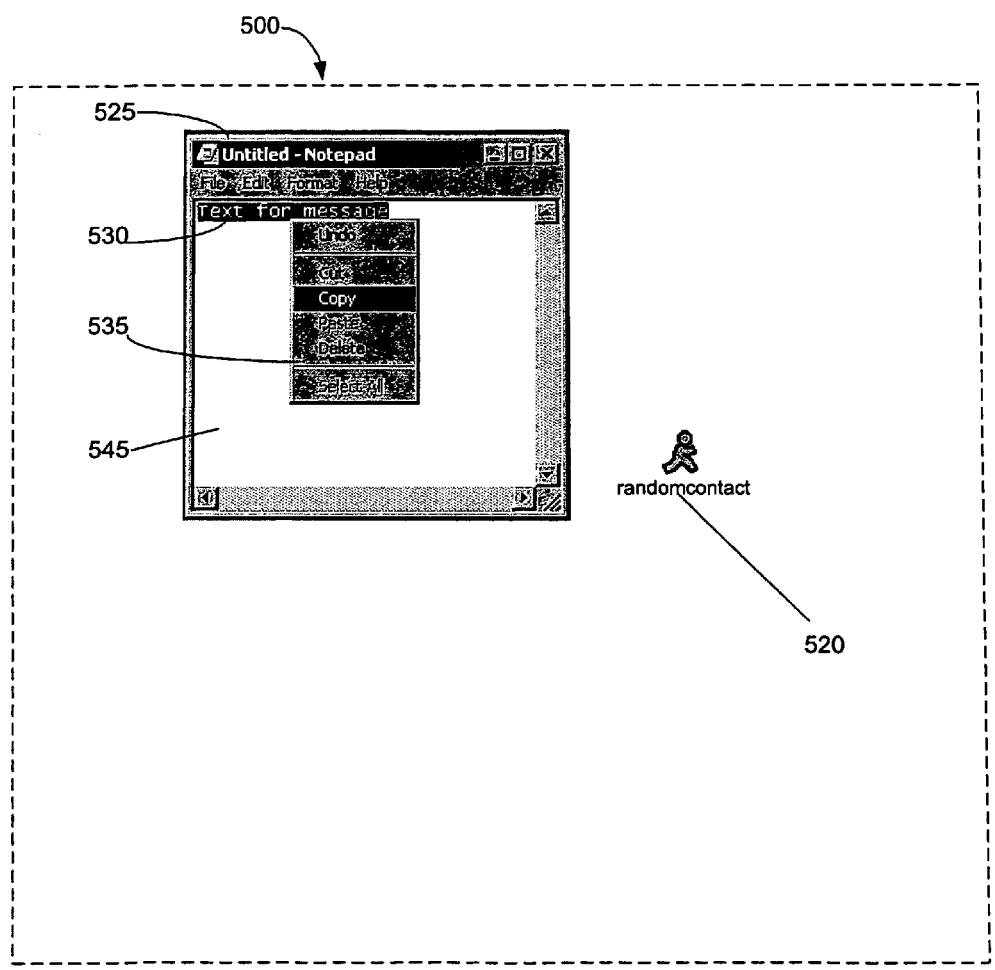
Figure 5F:
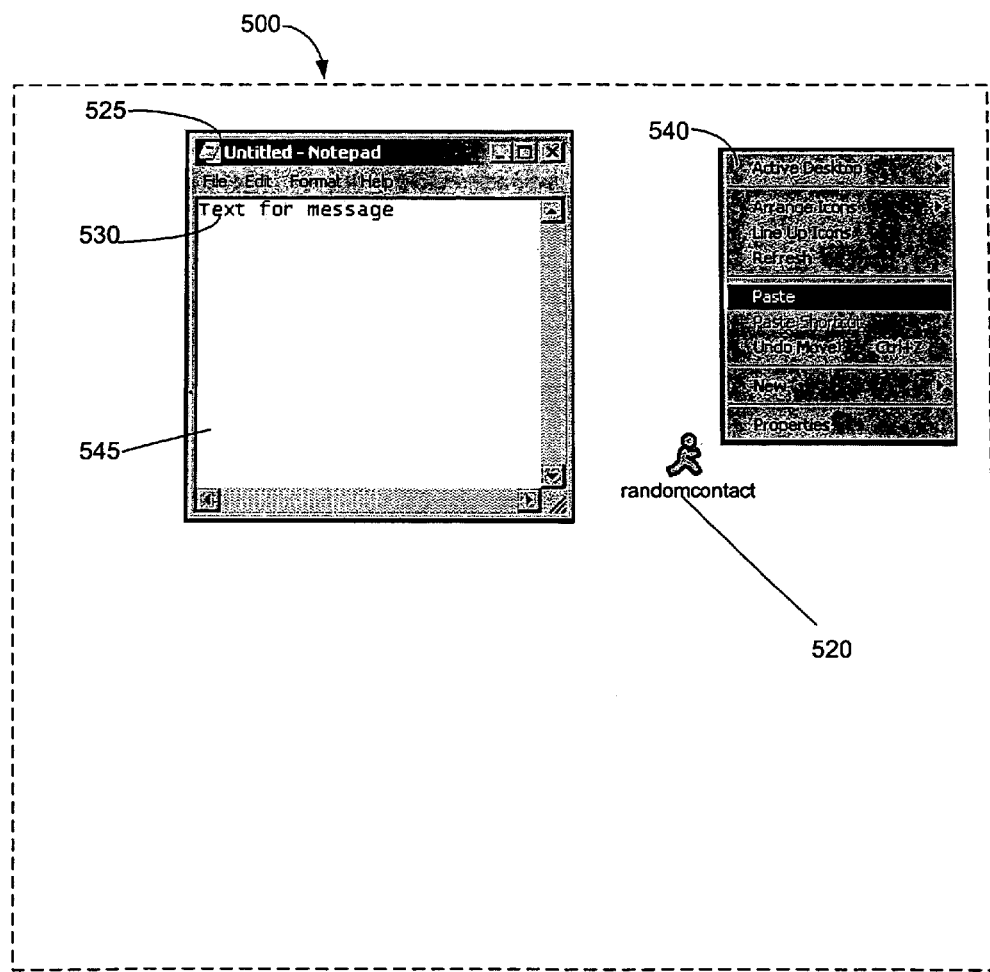

FIGS. 5E and 5F illustrate an alternative (or additional) manner in which instant messaging sessions can be supported by allowing a user to "copy" text from a document and "paste" it onto icon 520. Referring to FIG. 5E, a desktop 500 is shown with a user interface 525 of a text editor application. The interface 525 of the text editor has a text box 545 in which a user can type text, such as the text 530. The user can also "select" text 530, for example, by pressing a mouse button and dragging a pointer across the text 530. This results in text 530 being highlighted as shown.

After a user selects text 530, the user can "copy" the text, for example, by pressing a mouse button while the pointer is over the text to bring up a context menu 535 and selecting "copy" from the context menu 535. When copied, text 530 is stored by the operating system in a section of memory typically referred to as the "clipboard."

After text 530 has been copied, a user can then "paste" the text 530 to icon 520. Referring to FIG. 5F, the user pastes the text 530 to icon 520, for example, by pressing a mouse button while the pointer is over icon 520 to bring up a context menu 540 and selecting "paste" from the context menu 540. Selecting paste results in the executable program retrieving the text stored in the section of memory referred to as the clipboard. The executable program then passes the screen name that icon 520 represents and the text to the instant messaging program, along with an indication that the text is to be sent as an instant message. The instant messaging program then contacts a host server and transmits the text and screen name to the host server. The host server then directly communicates the text to the contact as an instant message.

Likewise, other operations may be performed on icon 520 to execute corresponding actions related to the contact represented by icon 520. For instance, right-clicking on icon 520 may bring up a context menu that has an option to set an alert when the contact comes online. Selecting the option results in the alert being set for the contact or set of contacts. Or, double-clicking on the icon may bring up profile information about the contact that icon 520 represents.

In addition, icon 520 may indicate the online presence of the contact it represents. A number of different techniques may be used to indicate online presence. For example, the shape or color of icon 520 may be different when the contact is online as opposed to when the contact is not online. Or, the contact's online status may be included in profile information that is displayed when a user double-clicks on icon 520. Similarly, icon 520 may show other contextual information regarding the contact, such as how long the contact has been online, whether the contact is away, or whether the contact is using a mobile device.

While the executable program has been described as communicating with the instant messaging program to accomplish the actions, in other implementations the executable program may be able to directly execute the actions itself without the need for an external program such as the instant messaging program.

Some implementations of the described techniques also may support a drag-and-drop method of creating the icon representing a contact. In this case, the icon can be created by dragging and dropping a representation of the contact in the user interface of the communications program onto an area other than the user interface.

Figure 6A:
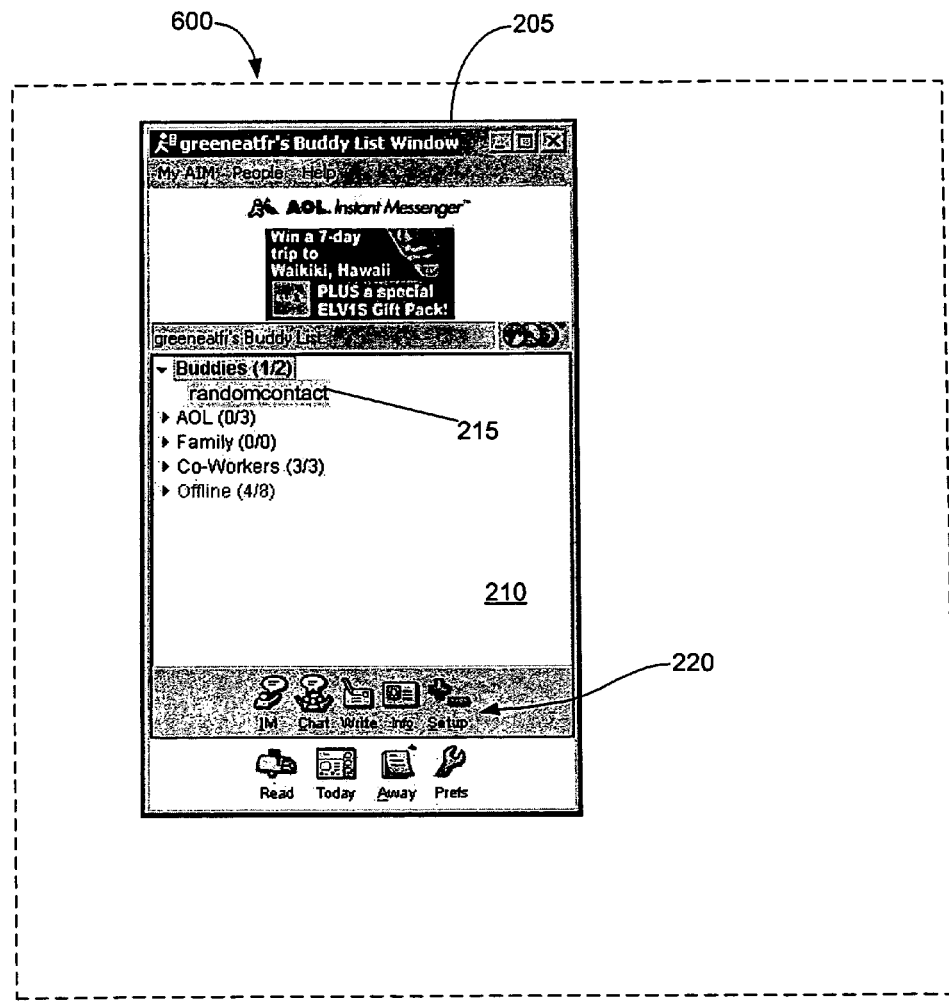
FIGS. 6A–6C are computer desktops illustrating a drag-and-drop manner of creating an icon that represents a contact in one implementation for an instant messaging program.
Figure 6B:
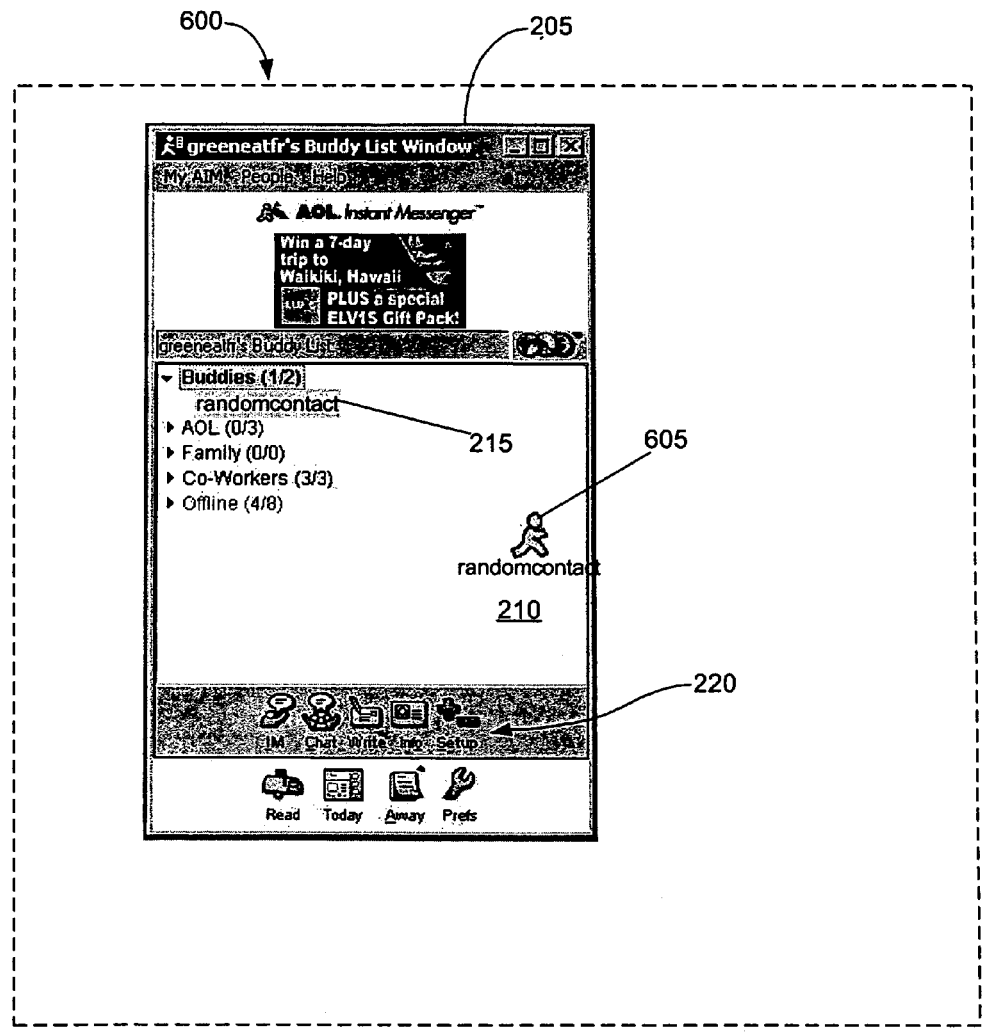
Figure 6C:
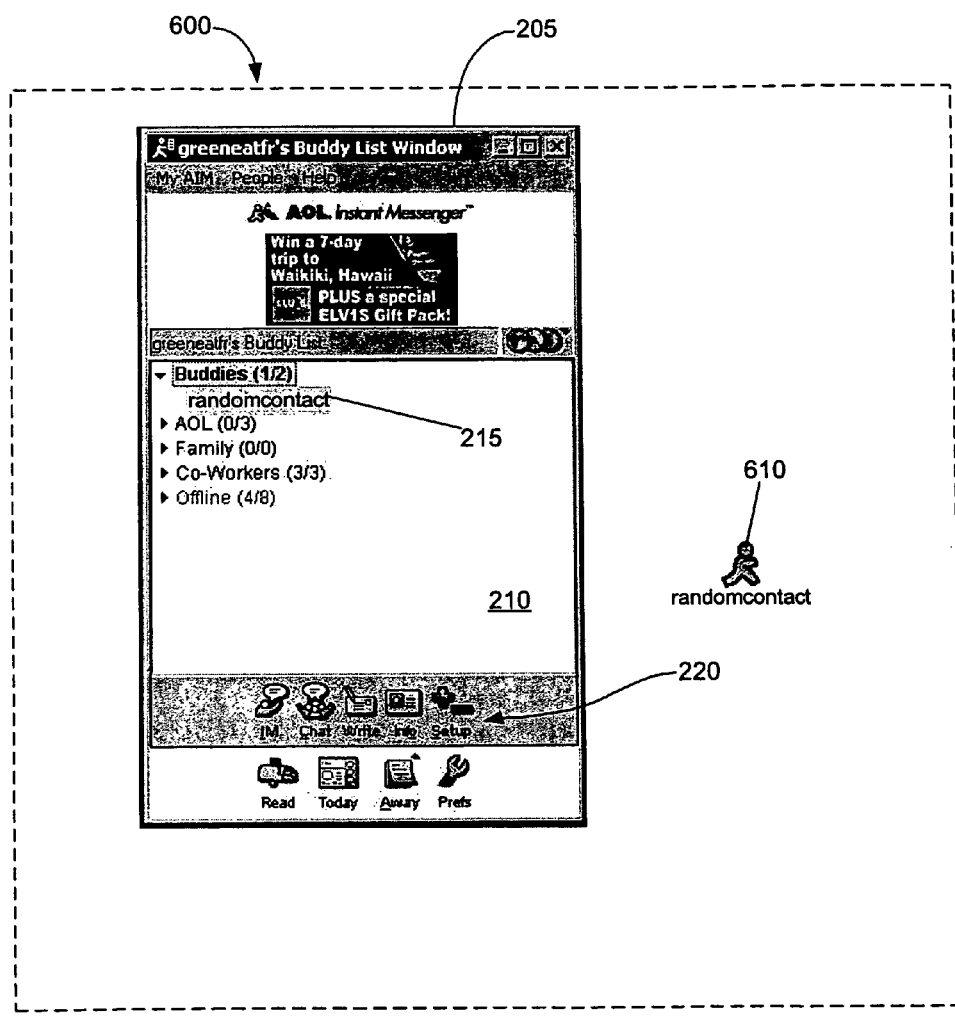

FIGS. 6A–6C illustrate a drag-and-drop manner of creating the icon in one implementation for an instant messaging program. To create the icon that represents the contact "randomcontact," the user selects the representation 215 of "randomcontact" in the instant messaging program's user interface 205 and drags that representation onto an area other than interface 205, such as desktop 600. To drag representation 215 onto desktop 600, the user first selects representation 215, for instance, by pointing at it and pressing a mouse button (shown in FIG. 6A). The user then drags representation 215 towards desktop 600 (shown in FIG. 6B). As the user drags the icon towards desktop 600, a transparent image 605 shows the user where the representation 215 is being dragged. Once image 605 is on top of desktop 600, the user drops image 605 by releasing the mouse button. When the user drops image 605 onto desktop 600, the icon 610 representing the contact is created (shown in FIG. 6C). Icon 610 also is associated with the corresponding executable program, or the executable program is created if it does not exist.

One implementation of creating the icon and executable program in a Macintosh OS X operating system environment uses a "skeleton" executable program and icon that are not specific to any particular contact. When representation 215 is dragged and dropped onto an area other than interface 205, the operating system performs a callback to inform the instant messaging program that representation 215 has been dropped. The instant messaging program then copies the skeleton executable program to the location where representation 215 was dropped. The copied executable program is given the name of the contact. This results in the icon being displayed with the screen name of the contact.

After the executable program is copied, the instant messaging program loads a static text string that contains substitution tokens. The instant messaging program then replaces the substitution tokens with the screen name of the contact. The resulting text is an uncompiled AppleScript. The instant messaging program compiles the AppleScript and inserts it into a resource in the executable program. Thus, once the executable program is created it is unique to that screen name and does not rely on any external data for that association to persist. Similar implementations can be applied to other operating system environments.

Some implementations of the described techniques also may support a drag-and-drop method of adding a contact to the contact list using the icon that represents the contact.

Figure 7A:
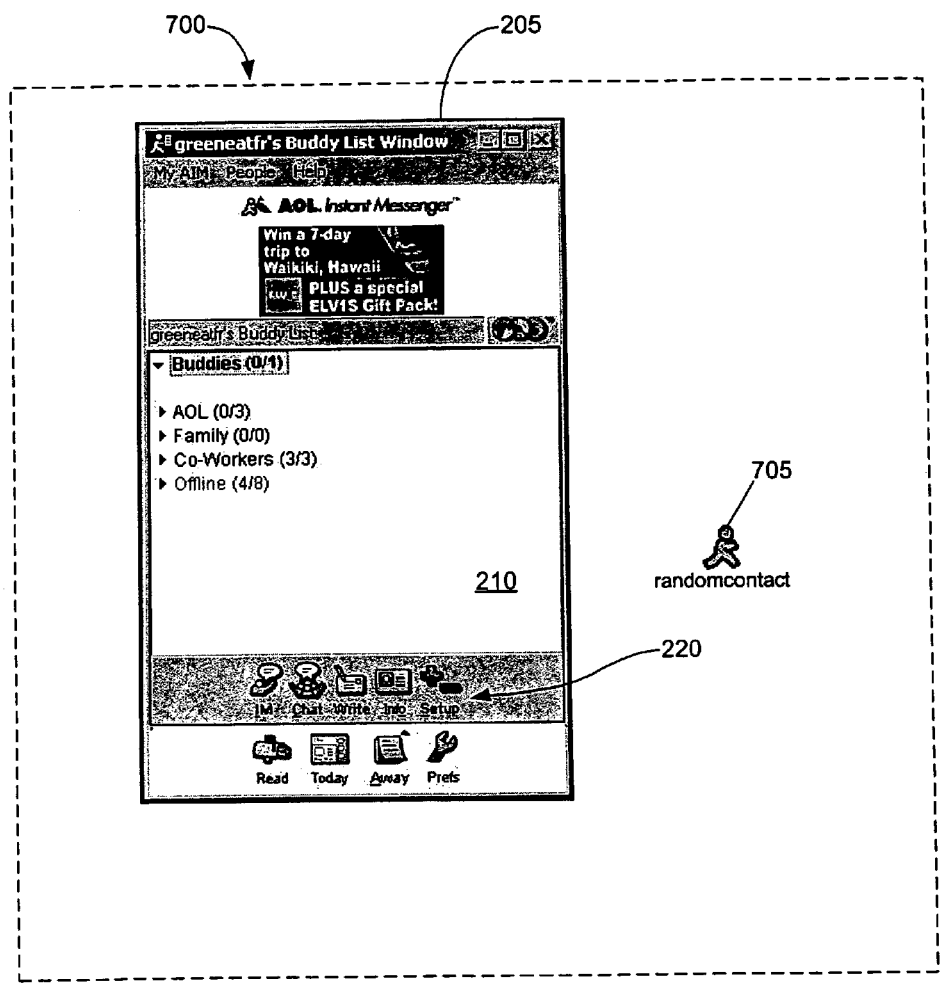
FIGS. 7A–7C are computer desktops illustrating a drag-and-drop manner of adding a contact to the contact list of an instant message program using an icon that represents the contact.
Figure 7B:
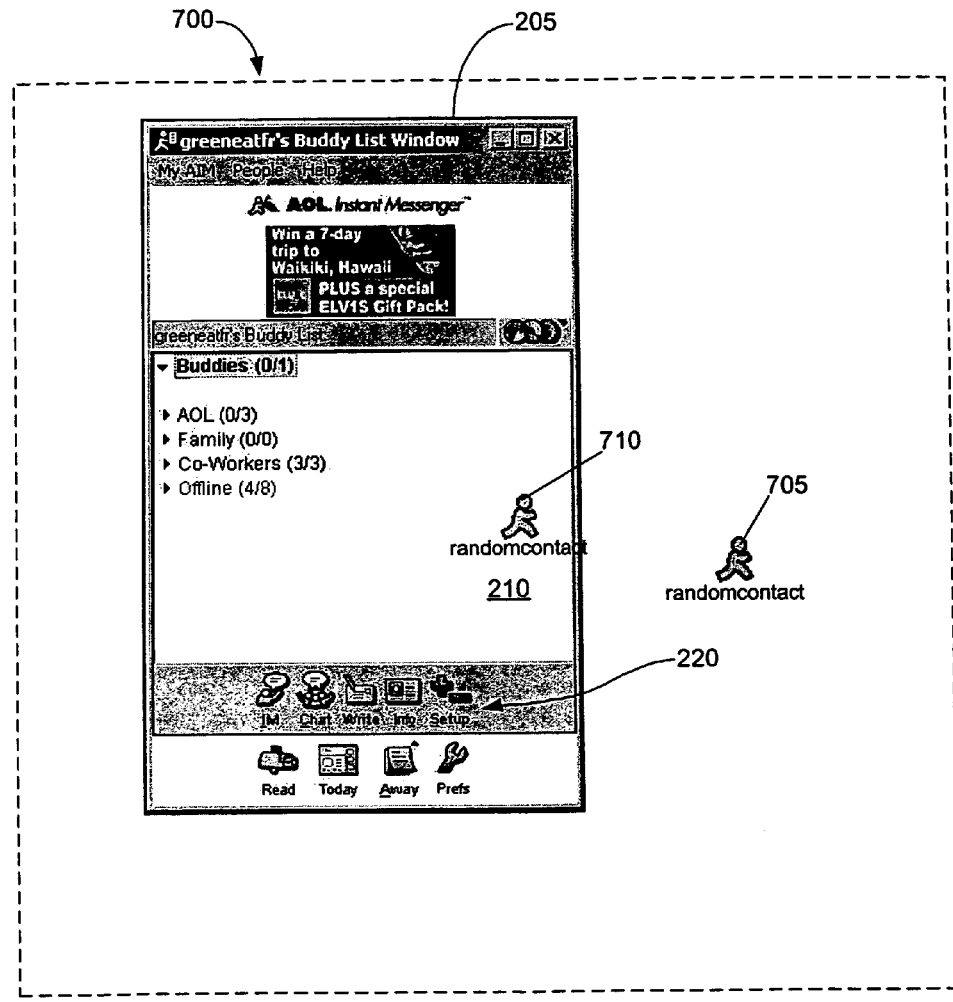
Figure 7C:
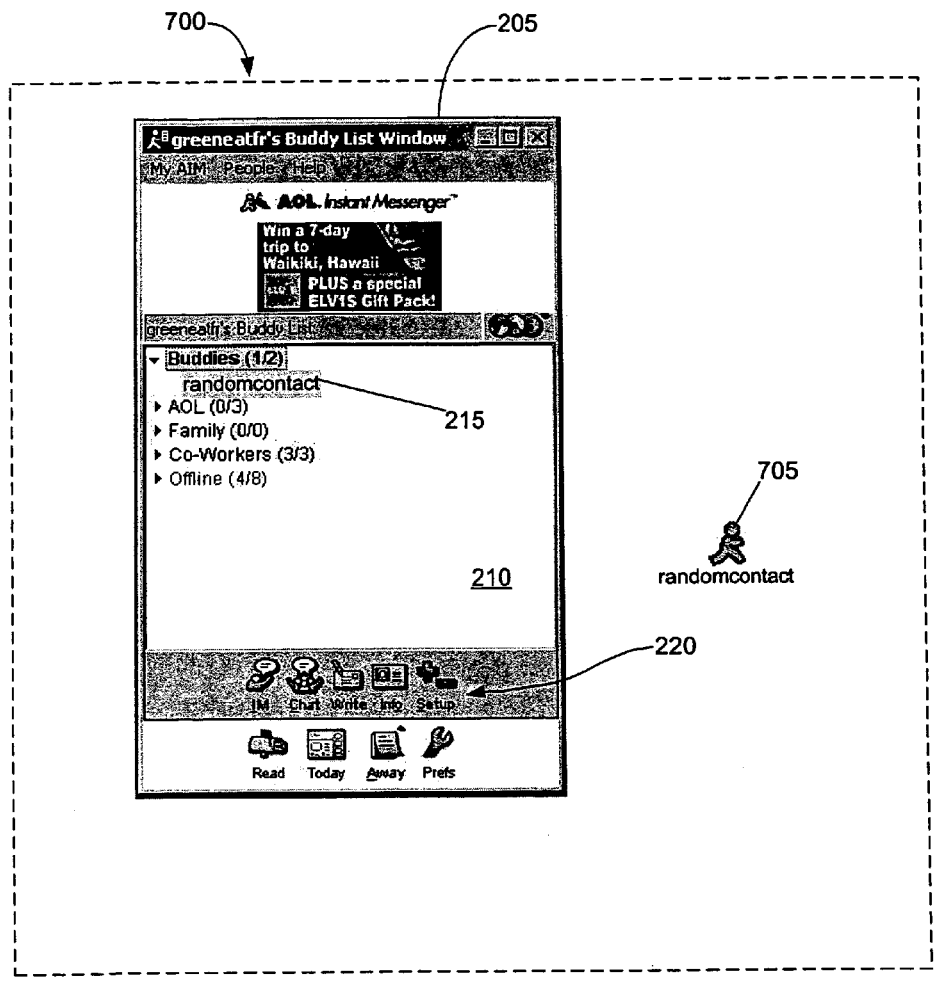

FIGS. 7A–7C illustrate a drag-and-drop manner of adding a contact to the contact list in one implementation for an instant messaging program. An icon 705 representing a contact is located on desktop 700. Icon 705 may have been placed on desktop in any manner. For instance, it may have been created on desktop 700 (e.g., by dragging and dropping from a first instant messaging program as described above) or moved onto desktop 700 after being created in a location other than the desktop. Or, a user of an instant messaging program on a different client system may have created icon 705 and transferred it to the client system providing desktop 700.

To add the contact represented by icon 705 to the contact list in the instant messaging program's user interface 205, the user selects icon 705 and drags it from the desktop (or other location) onto user interface 205. To drag icon 705 onto interface 205, the user first selects icon 705 and drags it towards interface 205 (shown in FIG. 7B). As the user drags the icon towards interface 205, a transparent image 710 shows the user where icon 705 is being dragged. Once image 710 is on top of interface 205, the user drops image 710. When the user drops image 710, the operating system informs the instant messaging program that image 710 has been dropped on interface 205. As a result, the instant messaging program obtains the screen name of the contact, adds the contact to the contact list, and creates the representation 215 of the contact in user interface 205 (shown in FIG. 7C). If the screen name is internally stored in the executable program corresponding to the icon (e.g., similar to the above described implementation for creating the icon and executable program in a Macintosh OS X operating system environment), the instant messaging program may communicate with the executable to obtain the screen name of the contact. Alternatively, if the filename of the executable program is the screen name of the contact, the instant messaging program may obtain the screen name from the filename of the executable.

Communications programs, including instant messaging programs, may allow a user to group contacts together in groups or sets. The described techniques can be applied to such groups or sets also. Thus, while some implementations have been shown using an icon that represents a single contact, the described techniques also may be used to provide an icon that represents a group or set of contacts in addition, or as an alternative, to providing an icon that represents a single contact.

Figure 8:
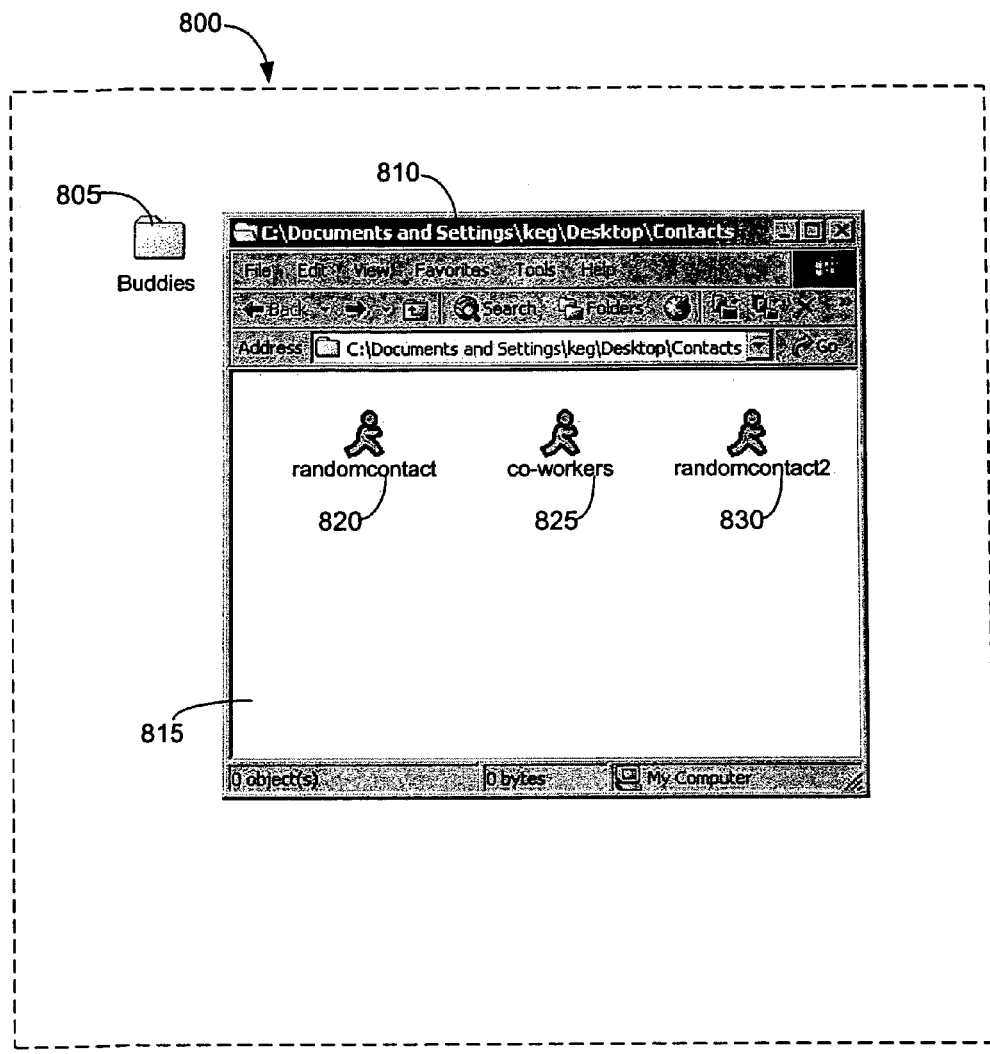
FIG. 8 is a computer desktop illustrating an implementation in which multiple icons, each representing either a contact or set of contacts, are situated in a desktop file folder.

FIG. 8 illustrates an implementation in which multiple icons, each representing either a contact or set of contacts, are situated in a desktop file folder. As shown, a file folder 805 is located on a desktop 800. The name of file folder 805 is "buddies." The contents of file folder 805 are displayed by opening it, for example, by double-clicking on file folder 805. When file folder is opened, a window 810 is displayed that shows the contents of file folder 805. Window 810 has a window area 815 in which the multiple icons are displayed. A first icon 820 represents the contact whose screen name is "randomcontact." A second icon 825 represents a set of contacts, collectively grouped as "co-workers." A third icon 830 represents the contact whose screen name is "randomcontact2."

A user can perform operations on any of the icons 820, 825, or 830 to cause actions to be executed for the contact represented by the respective icon, as described above. For instance, the program user can drop a binary file onto icon 820 to transfer the file to randomcontact. The program user can drop a text file (or paste text) on icon 825 to, depending upon a specified configuration, initiate a group chat session with the set of contacts grouped as "co-workers" or to invoke independent chat sessions with each contact in the "co-workers" group. The program user also, for instance, may set an alert for when randomcontact2 comes online by selecting icon 830 to bring up a context menu and selecting an alert option from the menu. In addition, icons 820, 825, and 830 may indicate the online presence, or other contextual information, of the respective contact it represents, also as described above.

The techniques described above are not limited to any particular hardware or software configuration. Rather, they may be implemented using hardware, software, or a combination of both. The methods and processes described may be implemented as computer programs that are executed on device comprising at least one processor and at least one data storage system (e.g., programmable computer, cellular phone, personal digital assistant, etc.). The data storage system may be any type of storage medium or device usable with a processor (e.g., CD-ROM, RAM, or magnetic disk). The programs may be implemented in a high-level programming language and may also be implemented in assembly or other lower level languages, if desired.

Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other communications programs such as FTP programs, e-mail programs, voice-over-IP (VoIP) or other telephony programs, or players for streaming media.

Other implementations are also within the scope of the following claims.

What is claimed is:

1. A method of facilitating communications across a network between users of at least one instant messaging program, the method comprising:
providing an icon that represents a contact or set of contacts of a user, wherein the icon is configured to allow a user to initiate and perform actions available from an interface of an instant messaging program that are associated with the contact or set of contacts without using the interface of the instant messaging program and regardless of whether an instant messaging program is running when an operation is performed on the icon;
recognizing that an operation has been performed on the icon by a user; and
executing at least one action in response to the operation performed on the icon, wherein the action is the same as an action that would be executed in response to an operation performed on a representation of the contact or set of contacts in the user interface of the instant messaging program.

2. The method of claim 1 wherein the icon is independent of any application user interface.

3. The method of claim 1 wherein the operation comprises associating information to be transmitted to the contact or set of contacts with the icon representing the contact or set of contacts.

4. The method of claim 3 wherein associating the information comprises dropping an icon representing the information to be transmitted to the contact or set of contacts on the icon representing the contact or set of contacts.

5. The method of claim 4 wherein executing at least one action comprises:
detecting that the icon representing information to be transmitted to the contact or set of contacts has been dropped on the icon representing the contact or set of contacts, and
automatically transmitting the information represented by the dropped icon to the contact or set of contacts in response to the icon representing information to be transmitted being dropped on the icon representing the contact or set of contacts.

6. The method of claim 5 wherein the information to be transmitted comprises a file, such that the file is automatically transmitted to the contacts or set of contacts in response to the icon representing the file being dropped on the icon representing the contact or set of contacts.

7. The method of claim 6 wherein automatically transmitting the file further comprises:
automatically establishing a communication session with the contact or set of contacts in response to the icon representing the file being dropped on the icon representing the contact or set of contacts; and
transmitting the file to the contact or set of contacts via the communication session.

8. The method of claim 5 wherein the information to be transmitted comprises a textual message such that the textual message is automatically transmitted to the contacts or set of contacts in response to the icon representing the textual message being dropped on the icon representing the contact or set of contacts.

9. The method of claim 8 wherein transmitting comprises transmitting the textual message to the contact or set of contacts via a host server.

10. The method of claim 1 wherein the contact or set of contacts is a single contact.

11. The method of claim 1 wherein the icon that represents a contact or set of contacts is available when the instant messaging program is not executing.

12. The method of claim 11 further comprising invoking the instant messaging program in response to the operation performed on the icon that represents a contact or set of contacts.

13. A method of facilitating the transfer of information between computer users of at least one instant messaging program on a network:
providing a first icon that represents a contact or set of contacts of a user and that is configured to allow a user to initiate and perform actions actions available from an interface of an instant messaging program that are associated with the contact or set of contacts without using the interface of the instant messaging program and regardless of whether an instant messaging program is running when an operation is performed on the icon;
recognizing that a second icon has been dropped onto the first icon, wherein the second icon represents information to be transmitted to the contact or set of contacts represented by the first icon; and
automatically transmitting the information represented by the second icon to the contact or set of contacts in response to the second icon being dropped on the first icon.

14. The method of claim 13 wherein the information to be transmitted comprises a file, such that the file is automatically transmitted to the contacts or set of contacts in response to the icon representing the file being dropped on the icon representing the contact or set of contacts.

15. The method of claim 14 wherein automatically transmitting the file further comprises:
automatically establishing a communication session with the contact or set of contacts in response to the icon representing the file being dropped on the icon representing the contact or set of contacts; and
transmitting the file to the contact or set of contacts via the communication session.

16. The method of claim 13 wherein the information to be transmitted comprises a textual message such that the textual message is automatically transmitted to the contacts or set of contacts in response to the icon representing the textual message being dropped on the icon representing the contact or set of contacts.

17. The method of claim 16 wherein the textual message is transmitted to the contact or set of contacts via a host server.

18. A method of facilitating communications across a network between users of at least one instant messaging program, the method comprising:
providing a file that is associated with a contact or set of contacts of a user, wherein the file is configured to allow a user to initiate and perform actions available from an interface of an instant messaging program that are associated with the contact or set of contacts without using the interface of the instant messaging program and regardless of whether an instant messaging program is running when a command is issued to the file;

recognizing that a command has been issued to the file; and executing at least one action in response to the command issued to the file, wherein the action is the same as an action that would be executed in response to an operation performed on a representation of the contact or set of contacts in a user interface of the instant messaging program.

19. The method of claim 18 further comprising representing the file with an icon.

20. The method of claim 19 wherein the commands comprise graphical commands such that the issued commands are graphical operations performed on the icon representing the file.

21. The method of claim 20 wherein the operations comprise associating information to be transmitted to the contact or set of contacts with the icon representing the file.

22. The method of claim 21 wherein associating the information comprises dropping an icon representing the information to be transmitted to the contact or set of contacts on the icon representing the file.

23. The method of claim 22 wherein executing at least one action comprises:

detecting that the icon representing information to be transmitted to the contact or set of contacts has been dropped on the icon representing the file, and automatically transmitting the information represented by the dropped icon to the contact or set of contacts in response to the icon representing information to be transmitted being dropped on the icon representing the file.

24. The method of claim 23 wherein the information to be transmitted comprises a file, such that the file is automatically transmitted to the contacts or set of contacts in response to the icon representing the file being dropped on the icon representing the file associated with the contact or set of contacts.

25. The method of claim 24 wherein automatically transmitting the file further comprises:

automatically establishing a communication session with the contact or set of contacts in response to the icon representing the file being dropped on the icon representing the file associated with the contact or set of contacts; and transmitting the file to the contact or set of contacts via the communication session.

26. The method of claim 23 wherein the information to be transmitted comprises a textual message such that the textual message is automatically transmitted to the contacts or set of contacts in response to the icon representing the textual message being dropped on the icon representing the file associated with the contact or set of contacts.

27. The method of claim 26 wherein transmitting comprises transmitting the textual message to the contact or set of contacts via a host server.

28. The method of claim 20 wherein the icon representing the file associated with the contact or set of contacts is available when the instant messaging program is not executing.

29. The method of claim 28 further comprising invoking the instant messaging program in response to the operation performed on the icon that represents the file associated with the contact or set of contacts.

30. The method of claim 18 wherein the contact or set of contacts is a single contact.

31. A tangible computer-usable storage medium storing a computer program for facilitating communications across a network between users of at least one instant messaging program, the computer program comprising instructions for causing a computer to:

provide an icon that represents a contact or set of contacts of a user, wherein the icon is configured to allow a user to initiate and perform actions available from an interface of an instant messaging program that are associated with the contact or set of contacts without using the interface of the instant messaging program and regardless of whether an instant messaging program is running when an operation is performed on the icon;

recognize that an operation has been performed on the icon by a user; and execute at least one action in response to the operation performed on the icon, wherein the action is the same as an action that would be executed in response to an operation performed on a representation of the contact or set of contacts in the user interface of the instant messaging program.

32. The tangible computer-usable storage medium of claim 31 wherein the icon is independent of any application user interface.

33. The tangible computer-usable storage medium of claim 31 wherein the operation comprises associating information to be transmitted to the contact or set of contacts with the icon representing the contact or set of contacts.

34. The tangible computer-usable storage medium of claim 33 wherein associating the information comprises dropping an icon representing the information to be transmitted to the contact or set of contacts on the icon representing the contact or set of contacts.

35. The tangible computer-usable storage medium of claim 34 wherein, to execute at least one action, the computer program further comprises instruction for causing a computer to:

detect that the icon representing information to be transmitted to the contact or set of contacts has been dropped on the icon representing the contact or set of contacts, and automatically transmit the information represented by the dropped icon to the contact or set of contacts in response to the icon representing information to be transmitted being dropped on the icon representing the contact or set of contacts.

36. The tangible computer-usable storage medium of claim 35 wherein the information to be transmitted comprises a file, such that the file is automatically transmitted to the contacts or set of contacts in response to the icon representing the file being dropped on the icon representing the contact or set of contacts.

37. The tangible computer-usable storage medium of claim 36 wherein, to automatically transmit the file, the computer program further comprises instruction for causing a computer to:

automatically establish a communication session with the contact or set of contacts in response to the icon representing the file being dropped on the icon representing the contact or set of contacts; and transmit the file to the contact or set of contacts via the communication session.

38. The tangible computer-usable storage medium of claim 35 wherein the information to be transmitted comprises a textual message such that the textual message is automatically transmitted to the contacts or set of contacts in response to the icon representing the textual message being dropped on the icon representing the contact or set of contacts.

39. The tangible computer-usable storage medium of claim 38 wherein transmitting comprises transmitting the textual message to the contact or set of contacts via a host server.

40. The tangible computer-usable storage medium of claim 31 wherein the contact or set of contacts is a single contact.

41. The tangible computer-usable storage medium of claim 31 wherein the icon that represents a contact or set of contacts is available when the instant messaging program is not executing.

42. The tangible computer-usable storage medium of claim 41 wherein the computer program further comprises instruction for causing a computer to invoke the instant messaging program in response to the operation performed on the icon that represents a contact or set of contacts.

43. A tangible computer-usable storage medium storing a computer program for facilitating the transfer of information between computer users of at least one instant messaging program on a network, the computer program comprising instructions for causing a computer to:
provide a first icon that represents a contact or set of contacts of a user and that is configured to allow a user to initiate and perform actions available from an interface of an instant messaging program that are associated with the contact or set of contacts without using the interface of the instant messaging program and regardless of whether an instant messaging program is running when an operation is performed on the icon;
recognize that a second icon has been dropped onto the first icon, wherein the second icon represents information to be transmitted to the contact or set of contacts represented by the first icon; and
automatically transmit the information represented by the second icon to the contact or set of contacts in response to the second icon being dropped on the first icon.

44. The tangible computer-usable storage medium of claim 43 wherein the information to be transmitted comprises a file, such that the file is automatically transmitted to the contacts or set of contacts in response to the icon representing the file being dropped on the icon representing the contact or set of contacts.

45. The tangible computer-usable storage medium of claim 44 wherein, to automatically transmit the file, the computer program further comprises instructions for causing a computer to:
automatically establish a communication session with the contact or set of contacts in response to the icon representing the file being dropped on the icon representing the contact or set of contacts; and
transmit the file to the contact or set of contacts via the communication session.

46. The tangible computer-usable storage medium of claim 43 wherein the information to be transmitted comprises a textual message such that the textual message is automatically transmitted to the contacts or set of contacts in response to the icon representing the textual message being dropped on the icon representing the contact or set of contacts.

47. The tangible computer-usable storage medium of claim 46 wherein the textual message is transmitted to the contact or set of contacts via a host server.

48. A tangible computer-usable storage medium storing a computer program for facilitating communications across a network between users of at least one instant messaging program, the computer program comprising instructions for causing a computer to:
provide a file that is associated with a contact or set of contacts of a user, wherein the file is configured to allow a user to initiate and perform actions available from an interface of an instant messaging program that are associated with the contact or set of contacts without using the interface of the instant messaging program and regardless of whether an instant messaging program is running when a command is issued to the file;
recognize that a command has been issued to the file; and
execute at least one action in response to the command issued to the file, wherein the action is the same as an action that would be executed in response to an operation performed on a representation of the contact or set of contacts in a user interface of the instant messaging program.

49. The tangible computer-usable storage medium of claim 48 wherein the computer program further comprises instructions for causing a computer to represent the file with an icon.

50. The tangible computer-usable storage medium of claim 49 wherein the commands comprise graphical commands such that the issued commands are graphical operations performed on the icon representing the file.

51. The tangible computer-usable storage medium of claim 50 wherein the operations comprise associating information to be transmitted to the contact or set of contacts with the icon representing the file.

52. The tangible computer-usable storage medium of claim 51 wherein associating the information comprises dropping an icon representing the information to be transmitted to the contact or set of contacts on the icon representing the file.

53. The tangible computer-usable storage medium of claim 52 wherein, to execute at least one action, the computer program further comprises instructions for causing a computer to:
detect that the icon representing information to be transmitted to the contact or set of contacts has been dropped on the icon representing the file, and
automatically transmit the information represented by the dropped icon to the contact or set of contacts in response to the icon representing information to be transmitted being dropped on the icon representing the file.

54. The tangible computer-usable storage medium of claim 53 wherein the information to be transmitted comprises a file, such that the file is automatically transmitted to the contacts or set of contacts in response to the icon representing the file being dropped on the icon representing the file associated with the contact or set of contacts.

55. The tangible computer-usable storage medium of claim 54 wherein, to automatically transmit the file, the computer program further comprises instructions for causing a computer to:
automatically establish a communication session with the contact or set of contacts in response to the icon representing the file being dropped on the icon representing the file associated with the contact or set of contacts; and transmit the file to the contact or set of contacts via the communication session.

56. The tangible computer-usable storage medium of claim 53 wherein the information to be transmitted comprises a textual message such that the textual message is automatically transmitted to the contacts or set of contacts in response to the icon representing the textual message being dropped on the icon representing the file associated with the contact or set of contacts.

57. The tangible computer-usable storage medium of claim 56 wherein transmitting comprises transmitting the textual message to the contact or set of contacts via a host server.

58. The tangible computer-usable storage medium of claim 50 wherein the icon representing the file associated with the contact or set of contacts is available when the instant messaging program is not executing.

59. The tangible computer-usable storage medium of claim 58 wherein the computer program further comprises instructions for causing a computer to invoke the instant messaging program in response to the operation performed on the icon that represents the file associated with the contact or set of contacts.

60. The tangible computer-usable storage medium of claim 48 wherein the contact or set of contacts is a single contact.

61. A device comprising:
  at least one processor;
  at least one data storage system;
  wherein the data storage system has a program stored therein, the program having instructions that cause the processor to perform the following:
    provide an icon that represents a contact or set of contacts of a user, wherein the icon is configured to allow a user to initiate and perform actions available from an interface of an instant messaging program that are associated with the contact or set of contacts without using the interface of the instant messaging program and regardless of whether an instant messaging program is running when an operation is performed on the icon;
    recognize that an operation has been performed on the icon by a user; and
    execute at least one action in response to the operation performed on the icon, wherein the action is the same as an action that would be executed in response to an operation performed on a representation of the contact or set of contacts in the user interface of the instant messaging program.

62. The device of claim 61 wherein the icon is independent of any application user interface.

63. The device of claim 61 wherein the operation comprises associating information to be transmitted to the contact or set of contacts with the icon representing the contact or set of contacts.

64. The device of claim 63 wherein associating the information comprises dropping an icon representing the information to be transmitted to the contact or set of contacts on the icon representing the contact or set of contacts.

65. The device of claim 64 wherein, to execute at least one action, the program further comprises instruction for causing the processor to:

detect that the icon representing information to be transmitted to the contact or set of contacts has been dropped on the icon representing the contact or set of contacts, and automatically transmit the information represented by the dropped icon to the contact or set of contacts in response to the icon representing information to be transmitted being dropped on the icon representing the contact or set of contacts.

66. The device of claim 65 wherein the information to be transmitted comprises a file, such that the file is automatically transmitted to the contacts or set of contacts in response to the icon representing the file being dropped on the icon representing the contact or set of contacts.

67. The device of claim 66 wherein, to automatically transmit the file, the program further comprises instruction for causing the processor to:
  automatically establish a communication session with the contact or set of contacts in response to the icon representing the file being dropped on the icon representing the contact or set of contacts; and
  transmit the file to the contact or set of contacts via the communication session.

68. The device of claim 65 wherein the information to be transmitted comprises a textual message such that the textual message is automatically transmitted to the contacts or set of contacts in response to the icon representing the textual message being dropped on the icon representing the contact or set of contacts.

69. The device of claim 68 wherein transmitting comprises transmitting the textual message to the contact or set of contacts via a host server.

70. The device of claim 61 wherein the contact or set of contacts is a single contact.

71. The device of claim 61 wherein the icon that represents a contact or set of contacts is available when the instant messaging program is not executing.

72. The device of claim 71 wherein the program further comprises instruction for causing the processor to invoke the instant messaging program in response to the operation performed on the icon that represents a contact or set of contacts.

73. A device comprising:
  at least one processor;
  at least one data storage system;
  wherein the data storage system has a program stored therein, the program having instructions that cause the processor to perform the following:
    provide a first icon that represents a contact or set of contacts of a user and that is configured to allow a user to initiate and perform actions available from an interface of an instant messaging program that are associated with the contact or set of contacts without using the interface of the instant messaging program and regardless of whether an instant messaging program is running when an operation is performed on the icon;
    recognize that a second icon has been dropped onto the first icon, wherein the second icon represents information to be transmitted to the contact or set of contacts represented by the first icon; and
    automatically transmit the information represented by the second icon to the contact or set of contacts in response to the second icon being dropped on the first icon.

74. The device of claim 73 wherein the information to be transmitted comprises a file, such that the file is automatically transmitted to the contacts or set of contacts in response to the icon representing the file being dropped on the icon representing the contact or set of contacts.

75. The device of claim 74 wherein, to automatically transmit the file, the program further comprises instructions for causing the processor to:
  automatically establish a communication session with the contact or set of contacts in response to the icon representing the file being dropped on the icon representing the contact or set of contacts; and
  transmit the file to the contact or set of contacts via the communication session.

76. The device of claim 73 wherein the information to be transmitted comprises a textual message such that the textual message is automatically transmitted to the contacts or set of contacts in response to the icon representing the textual message being dropped on the icon representing the contact or set of contacts.

77. The device of claim 76 wherein the textual message is transmitted to the contact or set of contacts via a host server.

78. A device comprising:
  at least one processor;
  at least one data storage system;
  wherein the data storage system has a program stored therein, the program having instructions that cause the processor to perform the following:
    provide a file that is associated with a contact or set of contacts of a user, wherein the file is configured to allow a user to initiate and perform actions available from an interface of an instant messaging program that are associated with the contact or set of contacts without using the interface of the instant messaging program and regardless of whether an instant messaging program is running when a command is issued to the file;
    recognize that a command has been issued to the file; and
    execute at least one action in response to the command issued to the file, wherein the action is the same as an action that would be executed in response to an operation performed on a representation of the contact or set of contacts in a user interface of the instant messaging program.

79. The device of claim 78 wherein the program further comprises instructions for causing the processor to represent the file with an icon.

80. The device of claim 79 wherein the commands comprise graphical commands such that the issued commands are graphical operations performed on the icon representing the file.

81. The device of claim 80 wherein the operations comprise associating information to be transmitted to the contact or set of contacts with the icon representing the file.

82. The device of claim 81 wherein associating the information comprises dropping an icon representing the information to be transmitted to the contact or set of contacts on the icon representing the file.

83. The device of claim 82 wherein, to execute at least one action, the program further comprises instructions for causing the processor to:
  detect that the icon representing information to be transmitted to the contact or set of contacts has been dropped on the icon representing the file, and
  automatically transmit the information represented by the dropped icon to the contact or set of contacts in response to the icon representing information to be transmitted being dropped on the icon representing the file.

84. The device of claim 83 wherein the information to be transmitted comprises a file, such that the file is automatically transmitted to the contacts or set of contacts in response to the icon representing the file being dropped on the icon representing the file associated with the contact or set of contacts.

85. The device of claim 84 wherein, to automatically transmit the file, the program further comprises instructions for causing the processor to:
  automatically establish a communication session with the contact or set of contacts in response to the icon representing the file being dropped on the icon representing the file associated with the contact or set of contacts; and
  transmit the file to the contact or set of contacts via the communication session.

86. The device of claim 83 wherein the information to be transmitted comprises a textual message such that the textual message is automatically transmitted to the contacts or set of contacts in response to the icon representing the textual message being dropped on the icon representing the file associated with the contact or set of contacts.

87. The device of claim 86 wherein transmitting comprises transmitting the textual message to the contact or set of contacts via a host server.

88. The device of claim 80 wherein the icon representing the file associated with the contact or set of contacts is available when the instant messaging program is not executing.

89. The device of claim 88 wherein the program further comprises instructions for causing the processor to invoke the instant messaging program in response to the operation performed on the icon that represents the file associated with the contact or set of contacts.

90. The device of claim 78 wherein the contact or set of contacts is a single contact.

* * * * *